United States Patent [19]

Skrmetta

[11] Patent Number: 5,156,873
[45] Date of Patent: Oct. 20, 1992

[54] MULTIPLE ZONE SHRIMP PRECOOKING METHOD AND APPARATUS FOR MACHINE PEELING SHRIMP

[76] Inventor: Raphael O. Skrmetta, 3536 Lowerline St., New Orleans, La. 70125

[21] Appl. No.: 754,025

[22] Filed: Sep. 3, 1991

[51] Int. Cl.$^5$ .................... A23L 1/00; A22C 29/00
[52] U.S. Cl. .................... 426/510; 99/443 C; 99/477; 99/516; 426/511; 426/523
[58] Field of Search .................... 426/510, 511, 523; 99/443 C, 404, 477, 516; 126/369; 452/2

[56] References Cited

U.S. PATENT DOCUMENTS 4,862,794  9/1989  Lapeyre et al. ............... 99/443 C
4,966,072 10/1990  Ellis-Brown ................... 99/443 C Primary Examiner—George Yeung
Attorney, Agent, or Firm—Fleit, Jacobson, Cohn, Price, Holman & Stern

[57] ABSTRACT

An apparatus for more effectively controlling the precooking operation by separating the precooking procedure into multiple distinct zones and controlling the temperature in each cooking zone. A porous conveyor belt conveys shrimp from a feeder tank at a temperature of approximately 40° F. into zone 1 maintained at a temperature of 212° F. and subsequently into zone 2 in which the temperature is maintained at 212° F. and finally into zone 3 and optionally into zone 4 maintained at a temperature less than 212° F. In zone 1 the mixture of air and steam from both above and below the shrimp will condense on the surface of the shrimp for control cooking in zone 1 in which the shrimp is heated to approximately 116° F. In zone 2, the same cooking procedure raises the cooking temperature of the shrimp to approximately 173° F. In zone 3, and optionally in zone 4, a controlled cooking atmosphere is maintained at 180° F. to 212° F. to permit equilibration of temperature of approximately 160° F. in the center of the shrimp for a time period sufficient to destroy active and inactive bacteria such as Listeria. The precooked shrimp are then discharged into an automatic shrimp peeling machine for subsequent processing.

11 Claims, 2 Drawing Sheets

MULTIPLE ZONE SHRIMP PRECOOKING METHOD AND APPARATUS FOR MACHINE PEELING SHRIMP

BACKGROUND OF THE INVENTION

1. Field of Invention

The present invention generally relates to precooking shrimp for more effective machine peeling of various species of shrimp. More specifically, the invention relates to an apparatus for more effectively controlling the precooking operation by separating the precooking procedure into multiple distinct zones and controlling the temperature in each cooking zone. A porous conveyor belt conveys shrimp from a feeder tank at a temperature of approximately 40° F. into zone 1 maintained at a temperature of 212° F. and subsequently into zone 2 in which the temperature is maintained at 212° F. and finally into zone 3 and optionally into zone 4 maintained at a temperature less than 212° F. In zone 1 the mixture of air and steam from both above and below the shrimp will condense on the surface of the shrimp for control cooking in zone 1 in which the shrimp is heated to approximately 116° F. In zone 2, the same cooking procedure raises the cooking temperature of the shrimp to approximately 173° F. In zone 3, and optionally in zone 4, a controlled cooking atmosphere is maintained at 180° F. to 212° F. to permit equilibration of temperature of approximately 160° F. in the center of the shrimp for a time period sufficient to destroy active and inactive bacteria such as Listeria. The precooked shrimp are then discharged into an automatic shrimp peeling machine for subsequent processing.

2. Description of the Prior Art

Effective peeling of precooked coldwater shrimp such as Pandalus Borealis has remained essentially unchanged since its inception and development by a Mr. Blomstrom in Sweden in approximately 1959. Various refinements have been made in the apparatus for precooking coldwater shrimp. U.S. Pat. No. 3,383,734 issued to James M. Lapeyre on May 21, 1968 and U.S. Pat. No. RE.26,971 issued Oct. 20, 1970, discloses a cooking hood suspended over an inclined conveyor belt which moves unpeeled shrimp to the entry point of an automatic shrimp peeling machine. In this patent, perforated steam pipes are located above the shrimp so that steam is forced downwardly onto the shrimp prior to the shrimp entering the peeling machine.

U.S. Pat. No. 3,581,652 issued on Jun. 1, 1971 to J. A. Chauvin discloses apparatus for shrimp to be cooked by steam condensate (flash steam) rising above boiling water at atmospheric pressure, as shrimp are moved on a porous conveyor belt through a single cooking zone covered with a hood.

U.S. Pat. No. 4,887,524 issued to Roy Ellis-Brown requires heat and pressure generated from steam directed upwardly within a housing under a conveyor belt with the shrimp being precooked in steam condensate (known as "flash") at a temperature always under 212° F.

U.S. Pat. No. 4,862,794 issued to George C. Lapeyre et al. on Sep. 5, 1989 discloses shrimp being cooked in an airless atmosphere under pressure at a temperature ranging between 180° F. to 212° F. in a single automatically controlled heat zone which does not permit controlled cooking temperatures when the automatic steam control valve varies the steam flow from on to off or partially on to off and as a result varies the cooking heat on the shrimp from 180° F. to 212° F. at all times during operation resulting in historisis which is the rate of response and degree of variation is not commensurate with the rate of product flow. It is well known to those in this art that tissues in the shrimp begin to breakdown when cooked by steam above atmospheric pressure. This results in a limited shelf life of canned shrimp which is one of the results of cooking shrimp under pressure None of the prior art prevent historisis and none of the prior art provides any apparatus to obtain quick constant high temperature for a time and then lower temperature equilibration for a time.

SUMMARY OF THE INVENTION

An object of the present invention is to provide an apparatus to precook shrimp and other food products in preparation for further processing and packaging with the apparatus including a structure for destroying certain bacteria such as Listeria and other bacteria in separate, controlled and regulated cooking zones.

Another object of the invention is to provide an apparatus in accordance with the preceding object in which three cooking zones are provided with cooking zones 1 and 2 providing constantly controlled saturated steam condensate at 212° F. on the surface of the shrimp moving on a perforated conveyor to the automatic peeler machine with this temperature being the highest constant atmospheric temperature possible with steam in order to destroy Listeria bacteria in shrimp. Cooking zone 3 and zone 4 if used are automatically controlled at a temperature less than 212° F. to allow the center of the shrimp to reach a temperature of 160° F. for a time period to destroy active and inactive Listeria and other bacteria. Thus, the apparatus of the present invention provides a means to destroy Listeria and other bacteria in shrimp by providing the maximum steam atmospheric heat for cooking zones 1 and 2 and lower heat in zone 3 and optional zone 4 equilibration areas to effectively destroy the harmful bacteria.

A further object of the invention is to provide an apparatus to cook shrimp in 3 or 4 zones as set forth in the preceding object in which zone 1 receives raw shrimp on a porous or perforated conveyor belt at approximately 40° F. and steam at full steam supply pressure of approximately 50 psi is discharged onto the shrimp from above and below the shrimp at 212° F. with the steam condensing on the surface of the shrimp for controlled cooking in zone 1 for heating the shrimp to approximately 116° F. in the interior. In zone 2, the same procedure of cooking raises the shrimp internal temperature to approximately 173° F. In zone 3 and zone 4 when used, a controlled cooking atmosphere is maintained at 180° F. to 212° F. by steam condensate "flash" which is different from true steam that has not changed to condensate. The results obtained by the apparatus include a final product having improved overall quality in that the shrimp are more evenly and economically cooked in the various cooking zones thereby providing a more effective peeling procedure for certain species of shrimp without wasting energy, by regulating and controlling the prepeeling cooking process with the apparatus of this invention more consistently and economically precooking Pandalus Borealis and other cold water shrimp of all sizes.

These together with other objects and advantages which will become subsequently apparent reside in the details of construction and operation as more fully here-

DESCRIPTION OF THE PREFERRED EMBODIMENT

Figure 1:
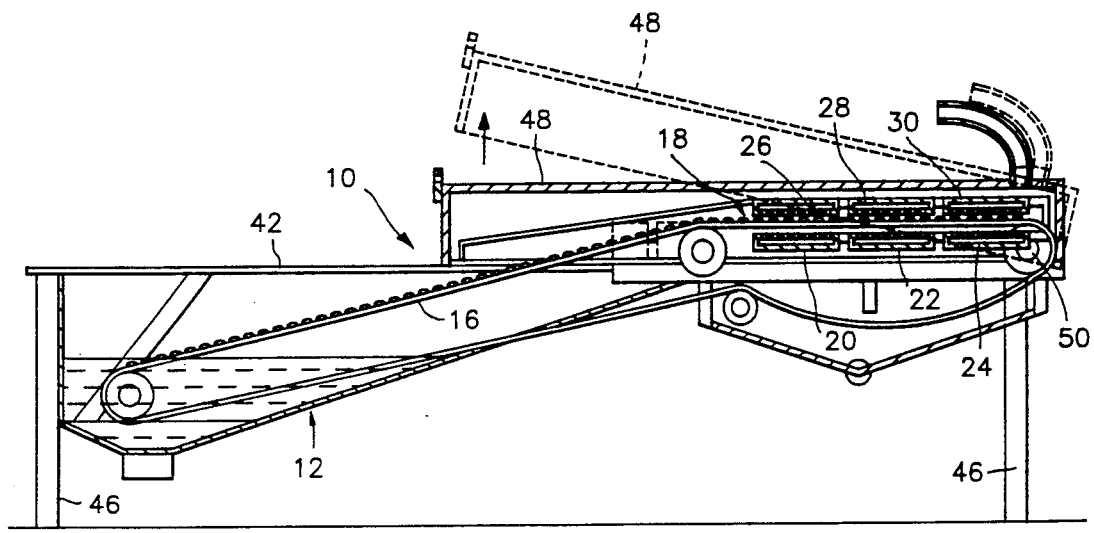
FIG. 1 is a side elevational view of the precooking apparatus of the present invention, with portions in section, illustrating the association of the components of the invention.
Figure 2:
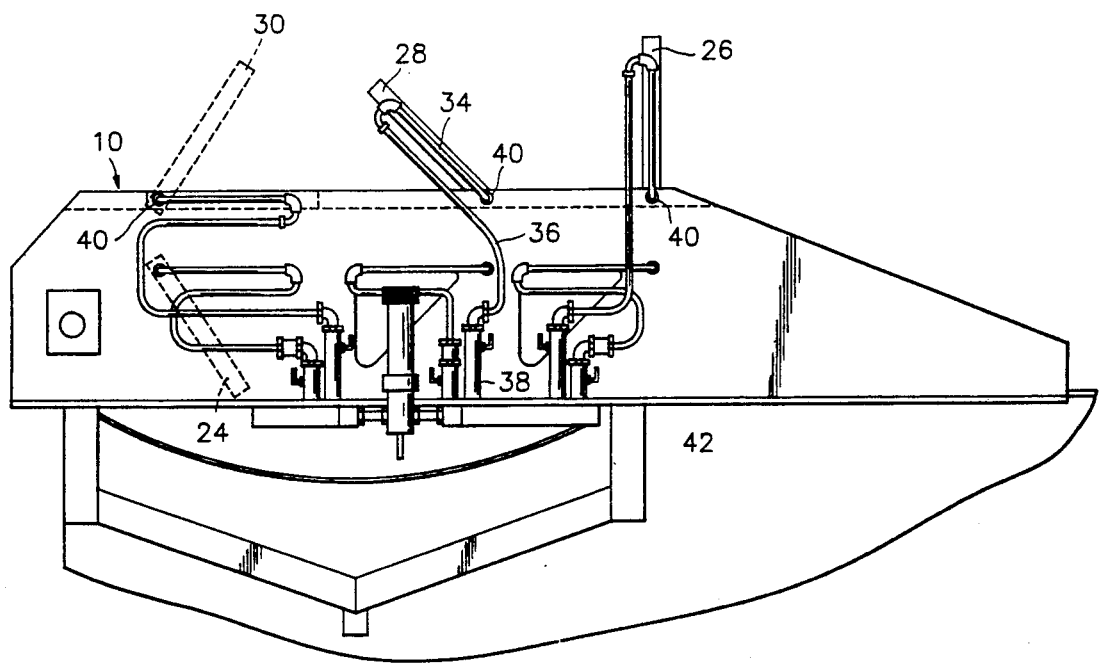
FIG. 2 is a side elevational view of the apparatus with certain of the steam manifolds pivoted to an open position to facilitate cleaning the apparatus.
Figure 3:
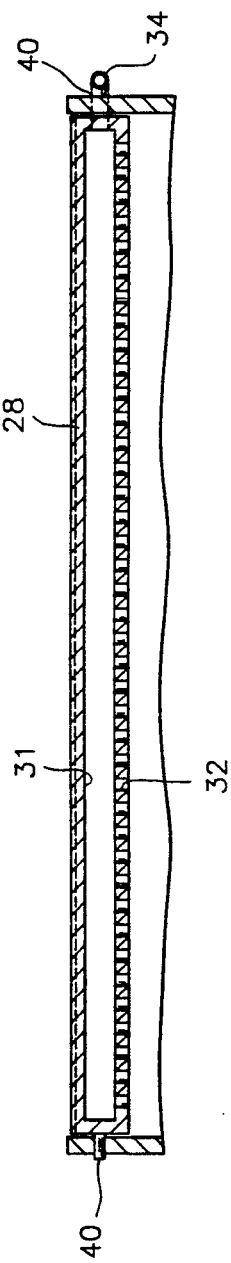
FIG. 3 is a sectional view of one of the steam manifolds.
Figure 4:
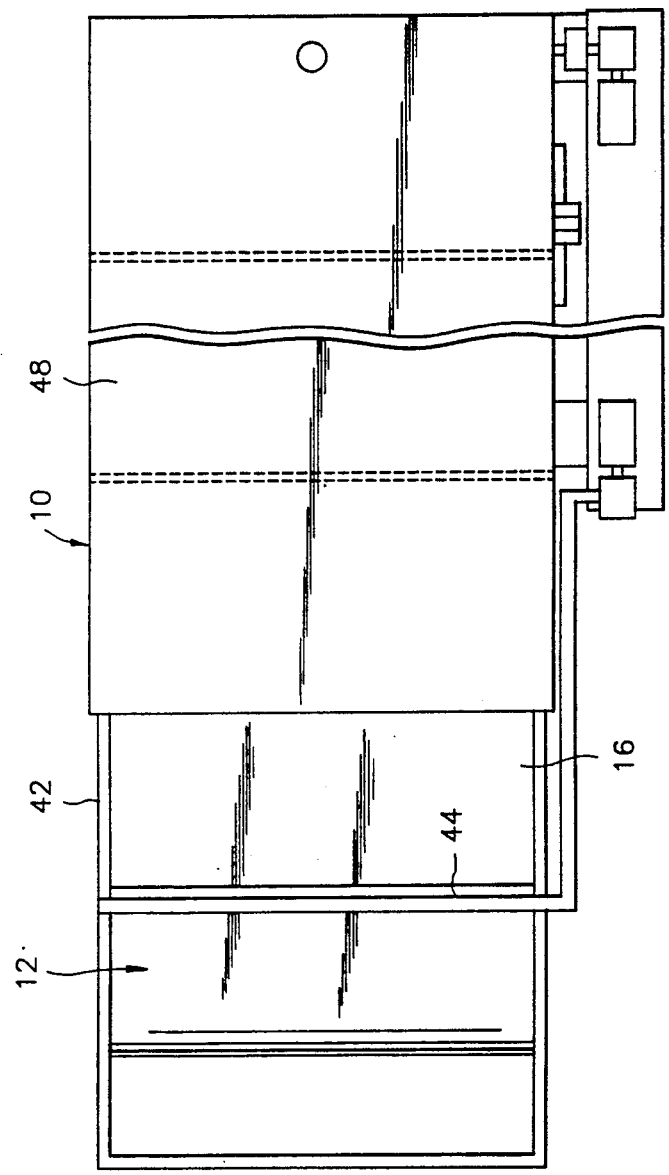
FIG. 4 is a top plan view illustrating the arrangement of the components of the invention.

Referring now specifically to the drawings, the multiple zone shrimp precooking apparatus for machine peeling shrimp is generally designated by reference numeral 10 and is associated with a feeder tank generally designated by reference numeral 12 at one end and an automatic shrimp peeling machine at its other end with this arrangement of components generally being disclosed in the above mentioned U.S. Pat. No. 4,862,794. The feeder tank 12 includes a perforated conveyor structure 16 which conveys shrimp upwardly from the feeder tank into the precooking apparatus 10 of the present invention with the perforated belt being constructed of plastic material and will move raw shell-on shrimp up and out of the feeder tank 12 onto a level or horizontal portion 18 of the precooking apparatus which includes three horizontally spaced, transversely extending steam manifolds 20, 22 and 24 positioned below the portion 18 of the perforated conveyor belt having shrimp thereon and three steam manifolds 26, 28 and 30 located above the horizontal portion 18 of the perforated belt with shrimp thereon with the manifolds 20 and 26 forming zone 1, manifolds 22 and 28 forming zone 2 and manifolds 24 and 30 forming zone 3 with the conveyor belt passing the shrimp through the three precooking zones before the shrimp are discharged into the automatic shrimp peeling machine. In some installations, a fourth zone identical to zone 3 can be incorporated for more effective precooking.

Each steam manifold includes a hollow interior 31 and a perforated panel 32 which discharges steam supplied from a suitable boiler directly toward the conveyor belt and the shrimp thereon. Each manifold includes an inlet pipe 34 which extends rigidly parallel to the end edge of the respective manifolds with one end of the pipe 34 being connected with a supply hose 36 which admits steam under regulated conditions by a control 38. Adjacent the other end of the inlet pipe 34 a hinge support 40 is provided on an edge of the manifold with which the inlet pipe is associated with the hinge axis being located at the edge of the manifolds remote from or adjacent to the feeder tank 12. This enables the manifolds to pivot about a horizontal axis at one edge of the manifolds with the top manifolds 26, 28 and 30 being manually pivoted upwardly to a generally vertical position to facilitate cleaning and the lower manifolds 20, 22 and 24 being pivoted downwarldy to approximately a 45° angle to facilitate cleaning of the manifolds and related structural frame members including longitudinal frame members 42 and transverse frame members 44 in which the frame structure is supported by depending legs 46 which may be braced in any suitable manner. The feeder conveyor 16 may be driven or powered by any suitable drive structure such as an electric motor in which the speed of movement of the conveyor belt and shrimp can be controlled thereby controlling the length of the time that the shrimp are subjected to precooking procedures Mounted above the horizontal portion 18 is a hood 48 of inverted pan-shaped configuration which may be constructed of stainless steel and provided with any suitable insulation with the hood being open on the bottom to retain the steam in heat exchange contact with the shrimp for effective precooking. The hood 48 can be lifted by a suitable hoist at one end with the other end pivoting about the end shaft 50.

With this invention, an apparatus is provided for controlled destruction of Listeria bacteria and effectively partially cooking shrimp prior to automatic machine peeling of certain species of coldwater shrimp such as Pandalus Borealis and other species Basically, the structure involves a perforated conveyor belt for moving raw shell-on shrimp up and out of a feeder tank and onto a horizontal portion where the shrimp or other material thereon are subjected to selected zone cooking for lengths of time which extend between a start position to a finish position at the end of an automatic machine peeler. The level portion of the conveyor is oriented in a hood to prevent escape of "flash" steam into the room atmosphere. The single conveyor belt 16 is used to both lift the shrimp out of the feeder tank 12 and to move the shrimp along the horizontal section 18 of the precooking apparatus and may be driven by any suitable means at an adjustable speed. The series of independent steam manifolds are located above and below the portion of the perforated conveyor carrying the shrimp thereby providing a controlled steam admitted over selected areas of the perforated belt with the selected areas being positioned between the start and finish positions of a horizontal section of the conveyor belt and they extend the full width of the perforated conveyor belt. Each of the steam manifolds includes a multiplicity of apertures to distribute steam evenly over the selected area and the steam discharge rate is adjusted in order to select the rate of delivery of steam without waste.

The hood is an open bottom inverted pan-shaped member which enables the conveyor belt to move shrimp up into the hood enclosure where the shrimp are continuously subjected to a set volume of steam as they move through each separate cooking zones on the perforated conveyor and are cooked to substantially different internal temperatures in each of the separate zones with the final cooking zone or zones being controlled at a temperature lower than 212° F. to allow temperature equilibration within the body of the shrimp for a time sufficient to destroy bacteria before entering the peeling machine.

By precooking coldwater shrimp or other species of shrimp and destroying Listeria and other bacteria, the subjecting of the shrimp to the multiple-zone cooking prior to machine peeling will improve the color and yield of the peeled shrimp. The multi-zone cooking and regulation provides significant improvement of balanced cooking and yield over present techniques and the apparatus allows the cooking zones to be carefully maintained so that shrimp of varying sizes can be evenly cooked with high yield and excellent quality.

The multiple-zone shrimp precooking apparatus of this invention effectively satisfies the need to precook the shrimp or other product at the most efficient rate possible with minimum energy requirements. This apparatus provides the maximum heat exchange possible to the shrimp or other introduced material without subjecting the product to overcooking and temperature fluctuations from thermostatic interruptions.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. An apparatus for precooking shrimp comprising a perforated conveyor belt for moving raw shell-on shrimp in a generally horizontal path at a selected speed, a plurality of steam manifolds positioned in underlying relation to the horizontal path of the conveyor belt, a plurality of steam manifolds located above the horizontal path of the conveyor belt, said steam manifolds extending substantially throughout the transverse width of the conveyor belt and being arranged in parallel relation, said manifolds above the belt being in alignment with the manifolds below the belt, said manifolds being disposed in adjacent spaced relation along the horizontal path of the belt, each of said steam manifolds including apertures for discharging steam toward the conveyor belt and raw shrimp thereon, and means separately controlling the steam discharged from the manifolds to control the cooking temperature of the shrimp moving along the horizontal path for discharge into a shrimp peeling machine.

2. The apparatus as defined in claim 1 wherein said means controlling the steam from the manifolds includes means controlling discharge of steam from the manifold at the entrance end of the horizontal path of movement of the conveyor belt and shrimp thereon to maintain a higher temperature than the manifold at the discharge end of the horizontal path of movement of the conveyor belt and shrimp thereon thereby initially cooking shrimp at a relatively high temperature and then cooking shrimp at a relatively low temperature while enabling equilibration of internal temperature of the shrimp.

3. The apparatus as defined in claim 1 wherein each of said manifolds includes an edge being pivotally supported for pivotal movement from a horizontal position parallel to the horizontal path of movement of the conveyor belt and shrimp to an angular divergins relation to the horizontal path of movement to facilitate cleaning of the manifolds.

4. The apparatus as defined in claim 1 together with a hood overlying the horizontal cooking path of the conveyor belt and shrimp, said hood being of inverted pan-shaped configuration with depending edge flanges, said hood being aligned with the steam manifolds with the flanges retaining steam in cooking relation to shrimp in the horizontal path of the conveyor belt.

5. The apparatus as defined in claim 1 wherein said means controlling the steam discharged from the manifold maintains cooking temperatures in zones at the entrance end of the horizontal path at 212° F. and at a lower temperature at the exit end of the horizontal path while the internal temperature of the shrimp will be equalized for producing a high quality precooked shrimp for discharge into a peeling machine.

6. The apparatus as defined in claim 2 wherein each of said manifolds includes an edge being pivotally supported for pivotal movement from a horizontal position parallel to the horizontal path of movement of the conveyor belt and shrimp to an angular divergins relation to the horizontal path of movement to facilitate cleaning of the manifolds.

7. The apparatus as defined in claim 6 wherein together with a hood overlying the horizontal cooking path of the conveyor belt and shrimp, said hood being of inverted pan-shaped configuration with depending edge flanges, said hood being aligned with the steam manifolds with the flanges retaining steam in cooking relation to shrimp in the horizontal path of the conveyor belt.

8. The method of precoooking shrimp to enable the shell to be removed when passing through a shrimp peeling machine consisting of the steps of conveying shell-on raw shrimp in a generally horizontal path through multiple separate cooking zones at a selected speed on a perforated support member in relation to a plurality of separate transversely extending, spaced parallel steam manifolds located above and below the path of movement with the manifolds discharging steam onto the shrimp from below and from above, and controlling the rate of steam discharged from each manifold below and above thereby controlling the temperature at which the raw shrimp are precooked in different zones as the raw shrimp move in a horizontal path.

9. The method as defined in claim 8 wherein cooking temperature in at least the first two zones is maintained at approximately 212° F. and the cooking temperature in at least one other zone near the discharge from the horizontal path being maintained below 212° F. to enable equilibration of the internal temperature of the shrimp.

10. Apparatus for precooking shrimp prior to entering a shrimp peeling machine comprising a conveyor belt supporting shrimp to be cooked thereon, said conveyor belt being movable in a generally horizontal cooking path at a selected speed from an entrance end to a discharge end, said cooking path including a plurality of separate cooking zones, each cooking zone including an upper and lower steam panel provided with apertures directing steam toward the conveyor belt and shrimp thereon, said steam panels being disposed in adjacent but spaced relation, and means controlling steam volume discharged from each of said steam panels and maintaining cooking temperature in a cooking zone at the entrance end of the cooking path at a higher temperature than a cooking zone at the discharge end of the cooking path to enable even cooking of the shrimp and equilibration of the internal temperature of the shrimp.

11. The apparatus as defined in claim 10 wherein the entrance end of said cooking path includes two cooking zones, said means controlling steam volume maintaining the temperature of said two cooking zones at approximately 212° F.

* * * * *